United States Patent
Brunner et al.

(10) Patent No.: US 7,948,721 B2
(45) Date of Patent: May 24, 2011

(54) AC MOTOR BYPASS WITH FAULT ANNUNCIATION, SERIAL COMMUNICATION AND FAULT TOLERANT COIL CONTROL

(75) Inventors: Jeffrey A. Brunner, Greenfield, WI (US); Kalyan P. Gokhale, New Berlin, WI (US); Douglas Karraker, Muskego, WI (US); Donald J. Truettner, Waukesha, WI (US); Dennis Tyczkowski, Franklin, WI (US)

(73) Assignee: ABB Inc., Cary, NC (US)

( * ) Notice: Subject to any disclaimer, the term of this patent is extended or adjusted under 35 U.S.C. 154(b) by 246 days.

(21) Appl. No.: 12/344,946

(22) Filed: Dec. 29, 2008

(65) Prior Publication Data

US 2009/0167229 A1   Jul. 2, 2009

Related U.S. Application Data

(60) Provisional application No. 61/018,085, filed on Dec. 31, 2007.

(51) Int. Cl.
*H02H 7/08* (2006.01)

(52) U.S. Cl. ........... 361/23; 318/798; 318/802; 318/503

(58) Field of Classification Search .................. 318/503, 318/519, 101, 264, 443; 700/17, 21, 26, 700/27, 116, 500, 508, 276; 361/23
See application file for complete search history.

(56) References Cited

U.S. PATENT DOCUMENTS

| | | | |
|---|---|---|---|
| 5,680,025 A * | 10/1997 | Bowers et al. | 318/806 |
| 6,160,365 A * | 12/2000 | Younger et al. | 318/16 |
| 6,445,332 B1 * | 9/2002 | Younger et al. | 341/176 |
| 7,167,348 B2 * | 1/2007 | Knox et al. | 361/23 |
| 7,224,557 B2 * | 5/2007 | Kinsella et al. | 361/2 |
| 7,462,999 B2 * | 12/2008 | Mitchell et al. | 318/490 |
| 7,598,628 B2 * | 10/2009 | Zver et al. | 307/115 |
| 7,721,564 B2 * | 5/2010 | Rizzo | 62/228.1 |
| 2003/0182944 A1 * | 10/2003 | Hoffman et al. | 60/772 |
| 2007/0256437 A1 * | 11/2007 | Singh et al. | 62/181 |
| 2008/0174257 A1 * | 7/2008 | Schnetzka et al. | 318/434 |

* cited by examiner

*Primary Examiner* — Rita Leykin
(74) *Attorney, Agent, or Firm* — Melissa Szczepanik; Michael Prewitt

(57) ABSTRACT

A motor bypass is controlled by a digital signal processor (DSP) with embedded control software that allows fault detection and annunciation, serial communications between both a variable frequency drive (VFD) and a bypass controller and the bypass controller and a host computer. The use of the DSP and embedded control software further allows for contactor coil control to provide fault tolerant operation as well as fault condition detection and annunciation to the user.

20 Claims, 6 Drawing Sheets

Drive and Bypass mode
State Diagram

Input Phase Loss
Detector

ABC Rotation

CBA Rotation

AC MOTOR BYPASS WITH FAULT ANNUNCIATION, SERIAL COMMUNICATION AND FAULT TOLERANT COIL CONTROL

CROSS REFERENCE TO RELATED APPLICATION

This application claims the priority of U.S. provisional patent application Ser. No. 61/018,085 filed on Dec. 31, 2007, entitled "AC Motor Bypass With Fault Annunciation, Serial Communication And Fault Tolerant Coil Control" the contents of which are relied upon and incorporated herein by reference in their entirety, and the benefit of priority under 35 U.S.C. 119(e) is hereby claimed.

FIELD OF THE INVENTION

This invention relates to an AC motor bypass system and more particularly to the use of a digital signal processor (DSP) and embedded software to provide serial communication, fault detection and annunciation and fault tolerant contactor coil control.

DESCRIPTION OF THE PRIOR ART

An AC motor bypass is an electromechanical device which is used in a motor control system. A typical bypass consists of a variable frequency drive (VFD), a pair of motor control devices such as contactors, and a motor overload detection device. The bypass provides redundancy in the motor control system such that if the VFD fails, the motor can continue to operate without interruption from the network connected to the power line.

Early bypass designs were comprised of discrete devices such as pushbuttons, pilot lamps and relays to implement ladder logic to control the bypass. Later designs employed microcontroller devices that controlled the bypass. The microcontroller designs used programming to control the operation of the bypass and significantly reduced the assembly time of the device by replacing discrete wires with program coding.

Bypass systems are commonly used in building automation systems that employ various communication protocols allowing the host controller to communicate with other devices on the network. Each device on the network must use a communication adapter to allow it to communicate with the host controller depending on the protocol used. Often times a separate communication adapter must be purchased in addition to the AC motor bypass to allow the bypass system to communication with the host controller.

Early bypass systems used contactors with 120 VAC coils to provide motor control. The 120 VAC control voltage was commonly derived from the main network power by the means of a control transformer. Very often network disturbances would be reflected back to the contactor coil via the transformer, causing intermittent operation of the contactor and sometimes coil failure.

Later bypass designs switched to contactors with DC coils which received their power from switching power supplies allowing for more fault tolerant operation. However in most cases the contactors with DC coils were not as available to the user as the contactors with AC coils and replacement costs can be quite high as compared to the replacement costs for the contactors with AC coils.

Bypass designs using early ladder logic control methods had very limited capability to detect and report failures or malfunctions in the system. Devices external to the bypass could be added to the design but sometimes at a high price penalty to the end user. Later bypass designs using microcontroller control devices had limited fault detection and annunciation capability that sometimes was limited by the device resources such as memory.

The VFD used in a bypass system typically has fairly sophisticated diagnostic fault detection and status reporting. In existing bypass designs, this VFD information is not made available to the bypass control portion of the bypass and hence the value of the fault detection and status reporting is diminished.

A common problem with earlier bypass designs is a fault that exists in the motor or wiring to the motor that provides a low impedance path between the motor bypass output and earth ground. When the bypass is activated to control the motor, this kind of fault can cause large currents to flow in the bypass. Because of the nature of existing bypass designs it can be prohibitively expensive to detect this fault condition before allowing these bypass designs to bypass the VFD.

Earlier bypass designs relied on the VFD to infer a phase loss by observing DC bus ripple to prevent automatic operation of the bypass if one of the phases in the main power network was missing. Connecting the bypass output to the motor in this condition can result in large motor currents.

The nature of a bypass system requires that the motor spin in the same direction when the VFD is controlling the motor as when it is connected in bypass mode. A problem with earlier bypass designs was that the user needed to perform diagnostic tests during commissioning of the bypass to ensure that the motor would spin in the same direction in both the VFD control and bypass modes of operation.

User serial communications on earlier bypass designs only communicated with the VFD included in the bypass. This was largely due to the lack of sophistication of the bypass control portion of the bypass. Therefore, the user was left unaware of the status of the bypass control portion of the bypass and was unable to control the bypass operation over serial communications.

A feature that was present on earlier bypass designs was underload detection. This was designed to detect if the load of the motor dropped to a low level, e.g. if a belt used to couple the motor shaft to a fan broke. If such a condition was detected, a fault was declared. Often, this is called broken belt detection. Since the bypass control had limited knowledge of the motor characteristics, the detection was crudely done only using motor current information. This resulted in difficult setup of the motor current threshold since, typically induction motors are controlled and a large portion of the induction motor current is due to magnetizing current which is independent of load.

SUMMARY OF THE INVENTION

A method for operating a bypass system for an AC motor. The system is capable of operating in a drive mode for driving the motor and a bypass mode for bypassing the drive mode. The method comprises:

a. powering up the bypass system to drive the motor in the drive mode;

b. detecting the existence of a system fault when the motor is operating in the drive mode; and c. prohibiting the system from entering the bypass mode when the system determines that a fault exists when the motor is operating in the drive mode.

A system for operating a motor comprising:

a source of AC voltage;

a variable frequency drive (VFD) for operating the motor from the AC voltage source in a drive mode, the VFD adapted to allow entry in the VFD a setup for the VFD;

a bypass controller for operating the motor from the AC voltage source in a mode that bypasses the operation of the motor by the VFD; and a serial communication channel connecting the VFD to the bypass controller to allow bidirectional communication between the VFD and the bypass controller to thereby have a duplicate of the VFD setup in the bypass controller.

A system for operating a motor comprising:

a source of three phase AC voltage;

a variable frequency drive (VFD) for operating the motor from the AC voltage source in a drive mode, the VFD having a settable current limit;

a bypass controller for operating the motor from the AC voltage source in a mode that bypasses the operation of the motor by the VFD; and a serial communication channel connecting the VFD to the bypass controller to allow bidirectional communication between the VFD and the bypass controller;

the bypass controller using a predetermined criteria to determine when one or more of the three phases are lost, the system prohibiting operation of the motor in the bypass mode when one or more of the three phases of the AC voltage source are lost.

DETAILED DESCRIPTION

Figure 1:
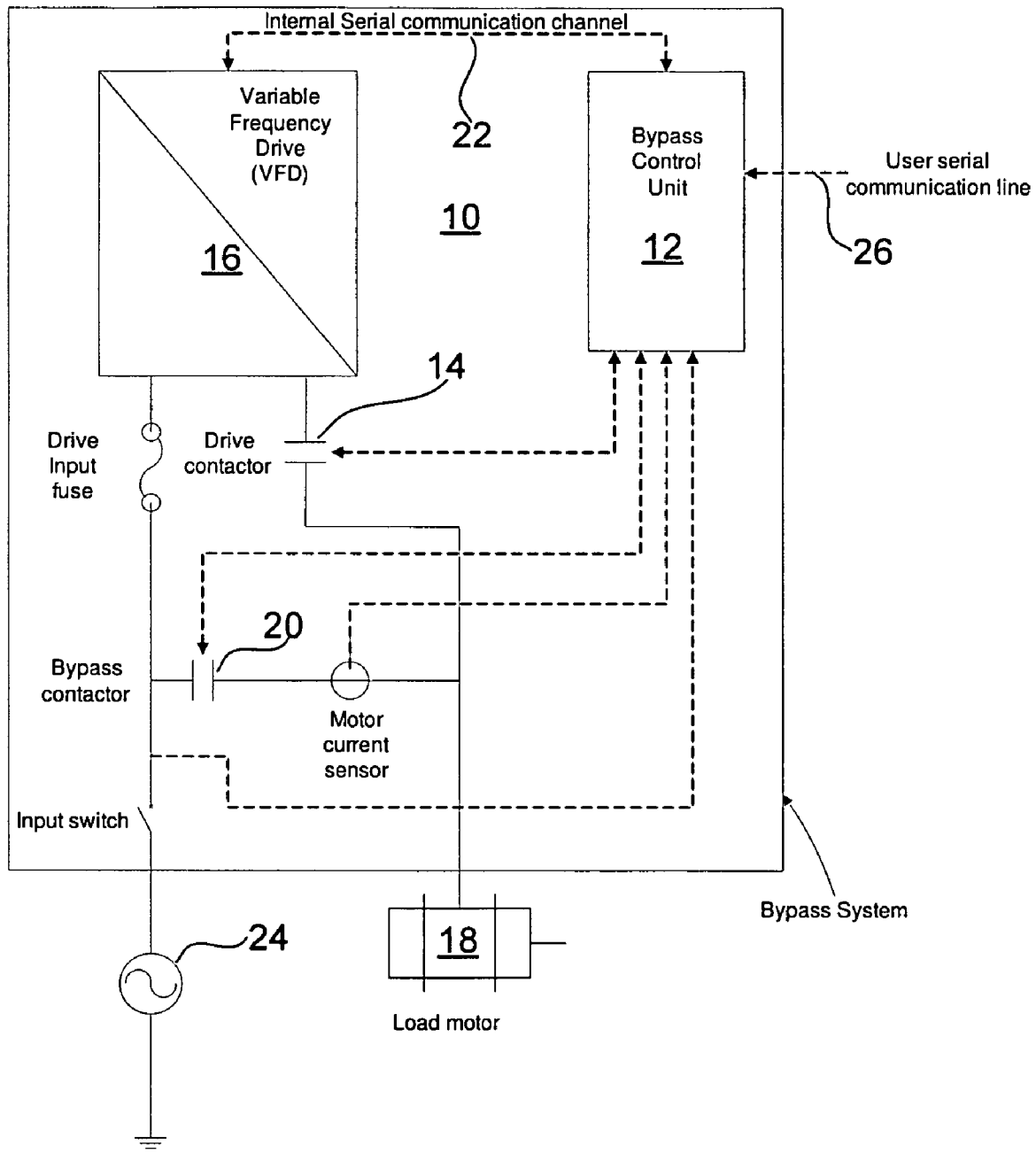
FIG. 1 shows a block diagram for the system of the present invention.
Figure 8:
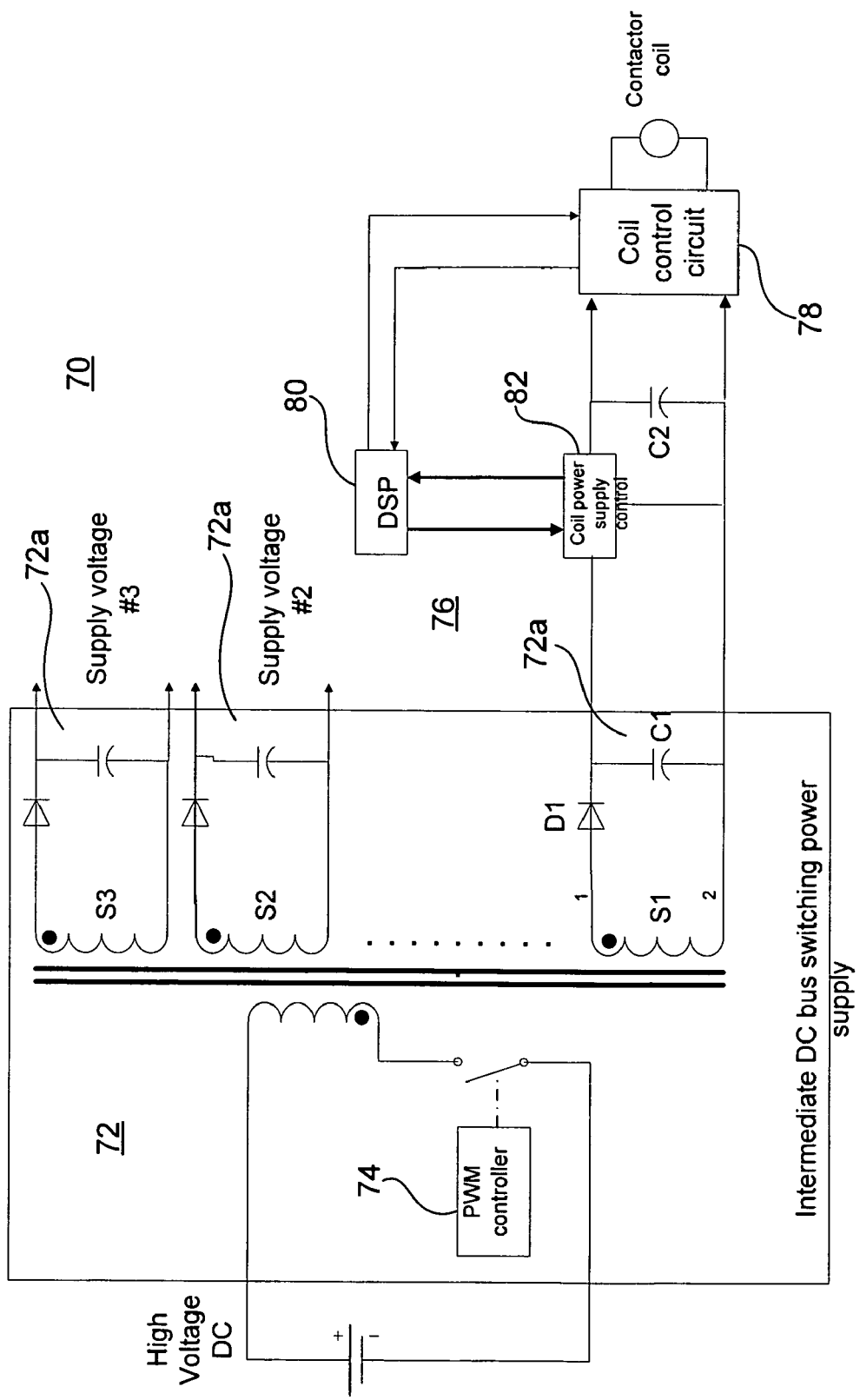
FIG. 8 shows the circuit for controlling the contactor coil.

Referring now to FIG. 1, there is shown a block diagram of the system 10 of the present invention. System 10 employs a low cost relatively high power digital signal processor (DSP), shown by reference numeral 80 in FIG. 8 described below, that allows for various communications protocols to be embedded in the bypass control unit 12 reducing the cost penalty to the end user. In addition to the native serial communication ability, the DSP 80 in conjunction with external circuits allows for detection of both external and internal faults and has the ability to annunciate the faults externally to the user. These faults are also recorded into the DSP memory for later analysis. The processing power of the DSP 80 is combined, as is shown in FIG. 8, with hardware circuits designed to control contactors with 120 VAC coils powered by a wide range switching power supply that produces an intermediate DC voltage.

The bypass system 10 has two main operating modes:

1) Drive mode where the drive contactor 14 is closed and the VFD 16 is connected to the motor 18; and 2) Bypass mode where the drive contactor 14 is open and the bypass contactor 20 may or may not be closed depending on the start condition of the system 10.

The bypass system 10 uses an internal serial communication channel 22 between the VFD 16 and bypass control unit 12 of the system. This internal channel 22 allows the bypass control unit 12 to use data from the VFD 16 as well as duplicate on the bypass control unit 12 the setup of the VFD 16 that the user has entered. For instance, when the VFD 16 is controlling the motor 18, the bypass control unit 12 can report the motor current to the user on the bypass control panel (not shown in FIG. 1) since it is reported to the bypass control unit 12 from the VFD 16 over the internal serial communication channel 22. Also, the user can set up and use the motor overload function of the VFD 16 using the VFD control panel (not shown in FIG. 1). This VFD control panel setup of motor overload is sent to the bypass control 12 over the internal serial communication channel 22 allowing the motor overload to work without interruption when transitioning between VFD 16 and bypass control 12.

Figure 2:
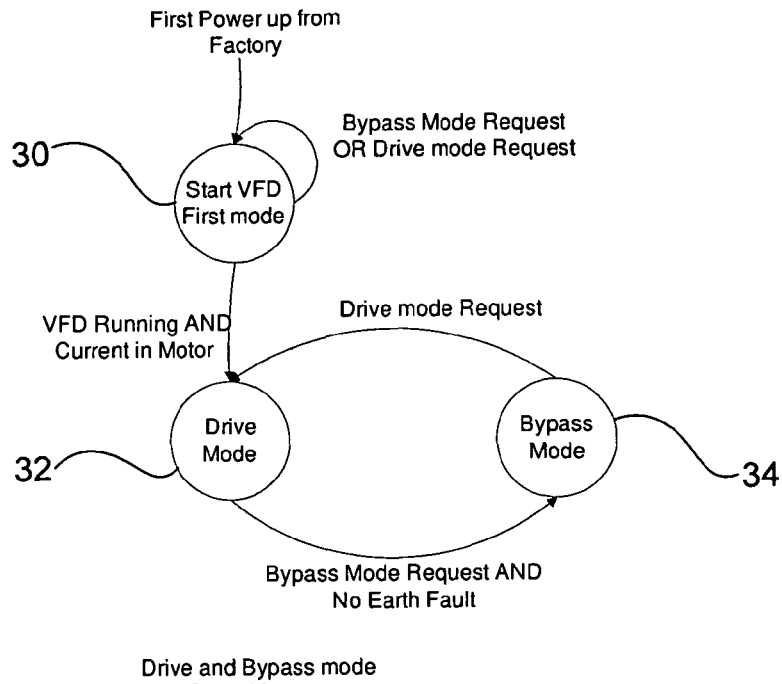
FIG. 2 shows a state diagram for the bypass and drive modes of the system of the present invention.

As is well known, the VFD 16 contains a fault detection circuit that allows the detection of a ground fault and safely shuts the VFD output off when such a fault is detected before damage is done to the VFD 16. The system 10 prohibits operation in bypass mode until the user has operated the VFD 16 and passed current through the motor 18 allowing the VFD earth fault detection circuit to operate. If the VFD 16 detects an earth fault, the transition to bypass is prevented. This mode of operation is described in the state diagram of FIG. 2.

As is shown in that diagram, the state that is entered upon first power up from the factory is the "Start VFD first mode" 30. State 30 is not exited until the VFD 16 is operating and current is flowing in the motor 18. When the VFD 16 has successfully done this, the user can switch between the Drive and Bypass mode states 32 and 34 respectively as long as an earth fault does not exist.

The system 10 automatically checks for a missing phase on the main power network 24 of FIG. 1 and prevents operation of the bypass contactor 20 if a phase is missing. This prevents the condition of high current in the motor 18 due to a missing phase.

Figure 3:
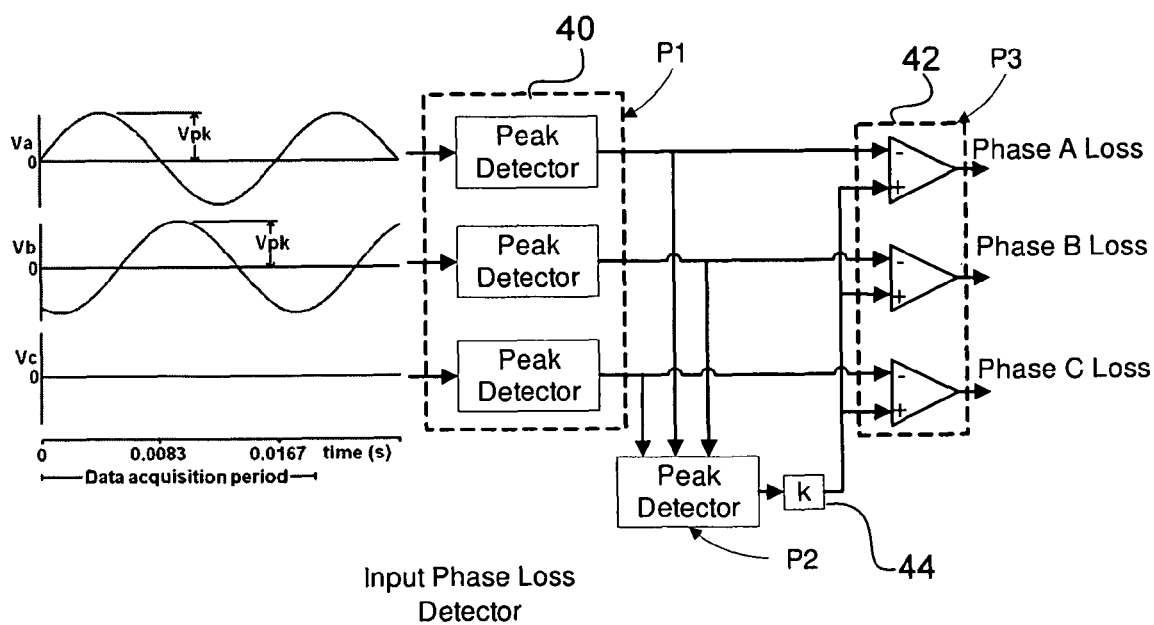
FIG. 3 shows the circuitry for detecting a missing AC input phase.

The missing input phase detection is illustrated in FIG. 3. The three peak detectors 40 in P1 sample the associated input phase's instantaneous voltage Va, Vb and Vc at a high sample rate, for instance, 10 kHz. The sampling is performed over a data acquisition period that is at least as long as the input voltage's sinusoidal period, for instance, 20 ms, which is sufficient for both 50 Hz and 60 Hz systems. At the end of the data acquisition period, the peak detector P2 finds the overall maximum of the three input phase's maximum voltages. The maximum voltage of each phase is then compared at an associated one of the comparators 42 in P3 to a fraction, k, of the overall maximum voltage. The value of k 44 can be equal to, for example, one half (½). If any phase's maximum voltage is less than k*the overall maximum voltage, then an input phase loss for that phase is declared at the output of the associated one of the three comparators 42.

The bypass control unit 12 does not prevent operation of the VFD 16 during a missing phase condition. However, the missing phase reduces the lifetime of the DC bus capacitor bank in the VFD 16. Therefore, since the bypass control 12 explicitly tests for a missing phase, it is able to use the internal serial communication channel 22 to reduce the current limit of the VFD 16 under this condition and prolong the life of the VFD 16.

Figure 4:
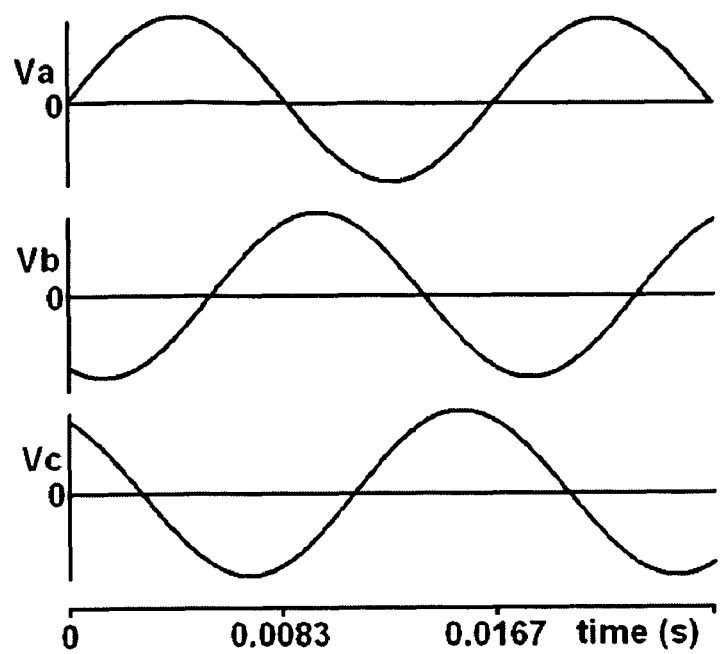
FIG. 4 shows the convention for forward rotation of a motor for a three phase input voltage.

System 10 checks the phase rotation of the main power network 24, shown in FIG. 1, as the network 24 is connected to the input of the bypass 12. By observing the phases of the three input voltages relative to one another, system 10 is able to determine if the motor 18 will spin in the same direction under VFD control and bypass control. FIG. 4 shows the convention for forward rotation for a three phase input voltage. The sinusoidal voltages present at each phase input are shifted by 120 degrees so that the A phase, the top waveform, occurs first, followed by the B phase, the middle waveform, and then by the C phase, the bottom waveform. This is commonly referred to as ABC rotation. The VFD 12 is wired in the bypass system 10 so that its forward operation produces ABC rotation.

Figure 5:
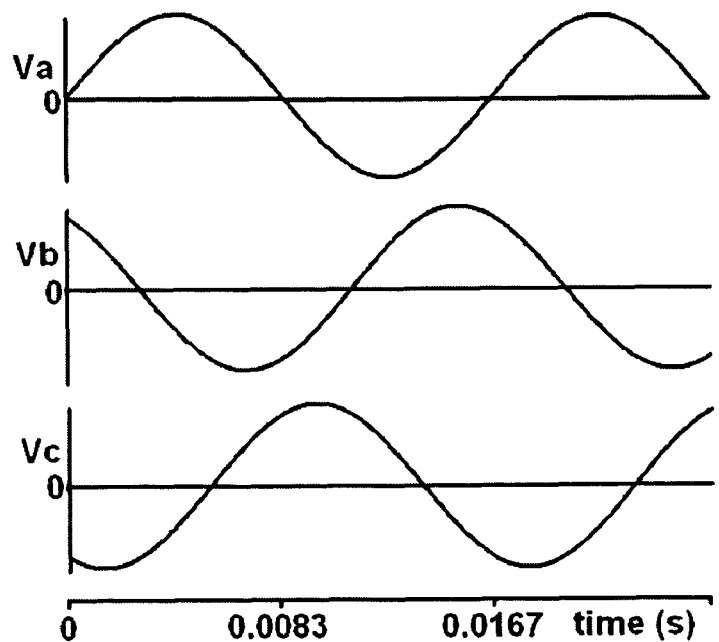
FIG. 5 shows the convention for reverse rotation of a motor for a three phase input voltage.

If the input voltage to the bypass system 10 is in reverse rotation commonly known as CBA rotation, as shown in FIG. 5, then the motor would spin in opposite directions in the bypass and drive modes. If this condition exists, a fault is declared. This simplifies commissioning of the bypass 10.

The present invention adds a serial control capability to the bypass control portion of the bypass system 10. Various serial protocols are implemented that are common to the various industries that typically use bypass units. The user is able to use the serial communication channel 26 to interrogate the status of the bypass control 12 and to set up the bypass control 12 by setting parameters over the serial channel 26. Since an internal communication channel 22 is also present between the bypass control 12 and the VFD 16, the user serial channel 26 can support communication with the VFD 16. This allows the user to communicate with both the VFD 16 and bypass control 12 with one set of wires connected at the bypass control 12. Also, if the VFD 16 fails and must be replaced, communication is still possible with the bypass control 12 since the communication control is implemented in that part of the bypass system 10.

A further benefit of the internal communication 22 between the VFD 16 and the bypass control 12 is that the user setup related to motor nameplate data is available to the bypass control 12. This allows for an improved motor underload detection method. The present invention estimates the output power of the induction motor 18 and the user sets a threshold based on output power level.

Figure 6:
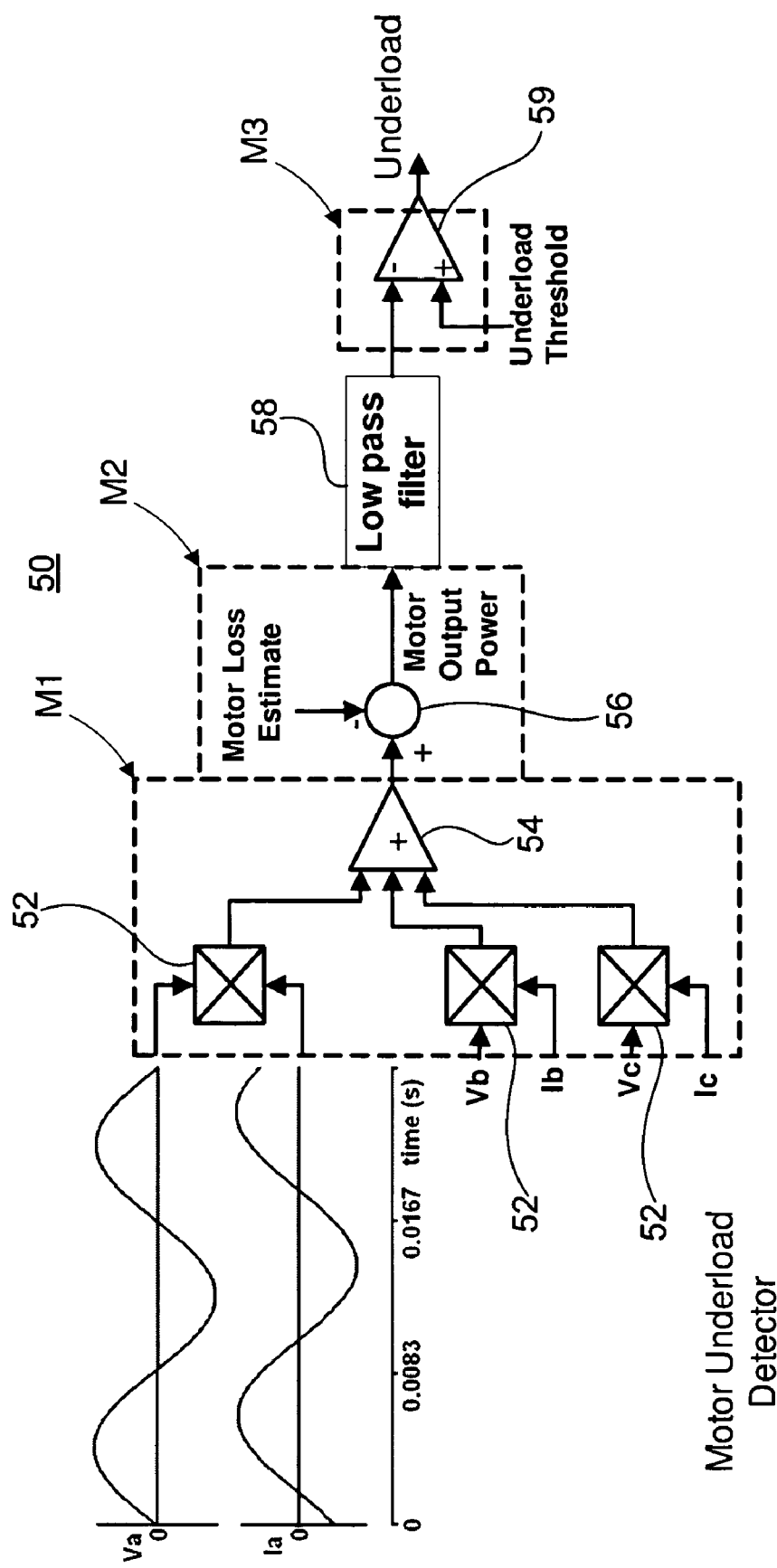
FIG. 6 shows in circuit form the detection of a motor underload.

FIG. 6 shows in the form of a circuit 50 the detection of a motor underload. The instantaneous currents and voltages of each of the three phases are multiplied together by an associated one of the three multipliers each designated by 52 in FIG. 6 and summed at summer 54 to estimate instantaneous motor input power in M1. The motor losses are estimated from the motor rated power, voltage and current provided by the VFD 16. These losses are subtracted from the motor input power at 56 to estimate the motor output power in M2.

The estimated motor output power is filtered by low pass filter 58 and M3 determines at comparator 59 using the filtered estimated motor output power and an underload threshold if a motor underload condition is present.

Using the estimated motor output power in determining if an underload condition is present eliminates the problem of magnetizing current that occurs in current only based underload detections.

The present invention incorporates motor phase loss detection in the bypass control 12 that detects if one or all phases of the bypass to motor connection are open.

Figure 7:
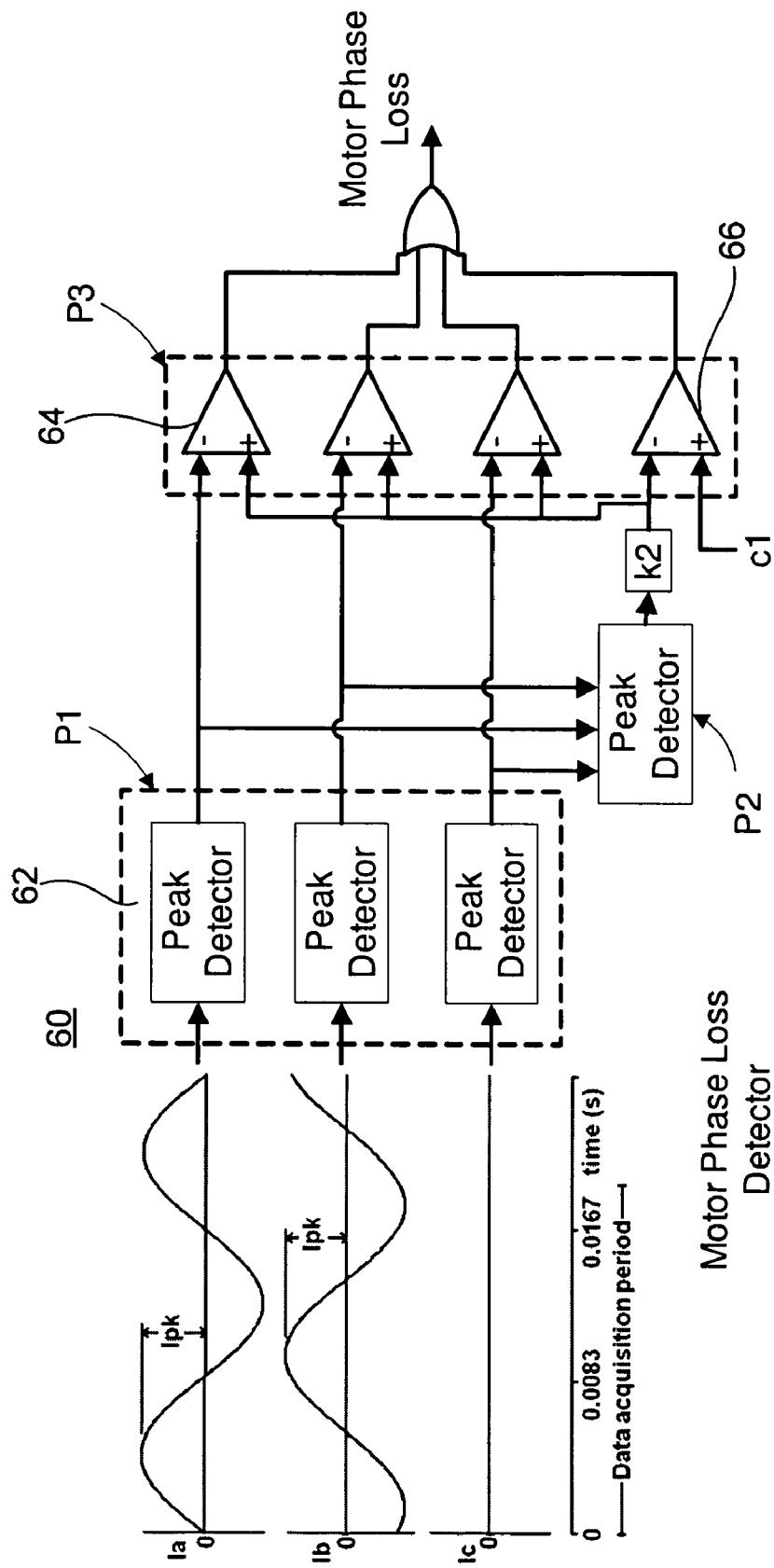
FIG. 7 shows the circuitry for detecting a missing motor phase.

The missing motor phase detection 60 is illustrated in FIG. 7. The three peak detectors 62 in P1 sample the instantaneous current of an associated one of each of the three motor phases at a high sample rate, for instance, 10 kHz. This sampling is performed over a data acquisition period that is at least as long as the motor current's sinusoidal period, for instance, 20 ms. At the end of the data acquisition period, the peak detector P2 finds the overall maximum of the three motor phase's maximum currents. The maximum current of each phase is then in P3 compared in an associated one of comparators 64 to a fraction, k2, of the overall maximum current. The value of k2 can be equal to, for example, one quarter (¼). If any phase's maximum current is less than k2* the overall maximum current, then a motor phase loss is declared. Also, the overall maximum motor current is compared at 66 to a threshold, c1, to determine if all motor phases are open. The threshold c1 can be equal to, for instance, 0.1* rated current of motor. If the overall maximum motor current is less than c1 then a motor phase loss is declared.

The bypass control 12 measures motor voltages and currents. From this information, an estimation of motor power in kW can be made as is shown in FIG. 6. Integrating the motor power over time allows the bypass control 12 to make an estimate of motor energy consumption in kWh and display that to the user.

The circuit 70 for controlling the contactor coil is illustrated in FIG. 8. The circuit 70 has a flyback power supply 72 having multiple output voltages each designated as 72a, with only the coil control power supply section 76 shown in detail at the bottom of FIG. 8. These output voltages are regulated to their designed values by the use of Pulse Width Modulation (PWM) controller 74. By using in the design of the power supply 72 transformer techniques well known to those in the art of designing power supplies, a very wide power conversion range can be achieved. The desired output voltages will remain at their designed values as long as the AC input voltage 24, shown in FIG. 1, to the power supply 72 is within the designated input range. The power supply 72 is capable of operating on either a single phase input power or a three phase input power. In one embodiment, the power supply 72 is designed to produce at its output 72a approximately 90 VDC.

FIG. 8 also shows the details in circuit 70 of the coil control power supply circuitry 76 between the 90V power supply output 72a and the input of the coil control circuit 78 of FIG. 8. The circuit 76 has the capability to disconnect the 90V supply from the coil control circuit 78 based upon decisions made by the DSP controller 80 of FIG. 8.

Operation of the coil control power supply is now described. High frequency AC voltage is developed across the bottom transformer secondary S1 based upon switching action impressed upon the primary of the transformer. Rectifier D1 becomes forward biased when the voltage on pin 1 of S1 is positive with respect to pin 2 of S1. Energy stored in the winding S1 is then transferred to capacitor C1. Rectifier D1 becomes reverse biased when the voltage on pin 1 of S1 is negative with respect to pin 2 of S1.

Capacitor C1 is used for pre-regulation prior to the circuitry in the coil power supply control 82 and capacitor C2 is used for bulk storage for the energy used by the coil control circuit 78. Capacitor C2 is dimensioned such that it has a storage capacity adequate to control a wide range of contactor coils and as such has a large value of capacitance. Large capacitance on the outputs of flyback converters can pose problems during startup of the supply in that they can be interpreted as a short circuit and thus cause the power supply to shut down.

The coil power supply circuit 82 is designed to have a current limit function that only allows a maximum amount of current to flow into capacitor C2 during the charge cycle. The current limit which is designed in hardware in circuit 82 and the capacitance of C2 are known in the firmware of DSP 80. By using the relationship of $$dT = \frac{C_2 * dV_{C2}}{I_{limit}},$$

where $C_2$ is the value of capacitance in microfarads (μF), $dV_{c2}$ is the voltage measured across capacitor C2, $I_{limit}$ is the hardware current limit and dT is the expected time to charge capacitor C2, and making a voltage measurement across C2, the DSP 80 can determine when the capacitor C2 should be fully charged.

After time dT has elapsed, a voltage measurement across C2 is performed and if the voltage is not within the allowable range, a control signal is sent to circuit 82 by DSP 80 to effectively disconnect C2 and the coil control circuit 78 from the 90V power supply output 72*a*. This is to prevent damage to the power supply 72 in general, and the 90V output in particular, if the storage capacitor C2 is defective or if the coil control circuit 78 becomes damaged. Since human intervention is required to terminate the contactor coils to the circuitry there will always exist a possibility of mis-wiring that could pose problems to the circuitry. By using the DSP 80 in conjunction with circuit 82, collateral damage can be minimized or eliminated by decoupling the coil control circuit 78 from the 90V power supply output 72*a*.

The 90V supply voltage is on the same magnetic structure as other supply voltages used in the design. In traditional flyback circuits, one output can heavily influence the other supply outputs, sometimes causing complete failure. In the event of a failure of the contactor coil during operation, the DSP 80 and circuit 82 can shut down the contactor coil supply and decouple the other power supply outputs 72*a* from the contactor coil supply. This is very important in that if the control power to the DSP 80 is still active, the DSP 80 can record the fault in memory. The fault can then be annunciated back to the user to help in the troubleshooting process as well as be accessed by the factory to investigate the failure.

The coils of the contactor used in this design are 120 VAC rated. The 90V DC supply voltage is pulse width modulated (PWM) to apply an average DC voltage to the contactor coil. The current in the contactor coil is measured and used as feedback to the DSP control. This closed loop control allows for stable operation of the contactor coil. The integration of the additional 90V output to the same magnetic structure of the existing power supply along with minimal hardware required to do the PWM for the contactor coils allows the design to use lower cost, commercially available 120 VAC contactor coils rather than dedicated DC contactor coils or expensive interface circuitry to control the 120 VAC contactor coils.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for operating a bypass system for an AC motor, said system capable of operating in a drive mode for driving said motor and a bypass mode for bypassing said drive mode, said method comprising:
   a. powering up said bypass system to drive said motor in said drive mode;
   b. detecting the existence of a system fault when said motor is operating in said drive mode; and
   c. prohibiting said system from entering said bypass mode when said system determines that a fault exists when said motor is operating in said drive mode.

2. The method of claim 1 wherein said system comprises a variable frequency drive (VFD) for driving said motor in said drive mode and said method further comprises operating said system in an initial mode upon said powering up and entering said drive mode from said initial mode when said VFD is driving said motor and current is flowing in said motor.

3. The method of claim 1 wherein said bypass system is powered by an AC voltage source having three phases, wherein said step of detecting the existence of a system fault further comprises using a predetermined criteria to determine when one or more of said three phases are missing.

4. The method of claim 2 wherein said bypass system comprises a bypass controller in serial communication with said VFD, said VFD including a settable current limit, wherein said method further comprises transmitting a signal from said bypass controller to said VFD using said serial communication, said signal causing said VFD to reduce said current limit when said bypass controller determines that one or more of said three phases of said AC voltage source are lost.

5. The method of claim 4 wherein, when said bypass system is commissioned, said bypass controller determining if said AC motor will rotate in the same direction when in said bypass operating mode and in said drive mode, and indicating a fault condition when said bypass controller determines that said motor will not rotate in the same direction when in said bypass mode and drive mode.

6. The method of claim 1 further comprising determining if a motor underload condition is present.

7. The method of claim 6 wherein said bypass system is powered by a three phase power supply, wherein said step of determining if a motor underload condition is present comprises determining the instantaneous current and voltage of each phase of said three phase power supply; summing the product of each said instantaneous voltage, each said instantaneous current and an associated multiplier to estimate an instantaneous motor input power.

8. The method of claim 7 further comprising estimating motor losses from the motor rated power, voltage and current, subtracting said motor losses from said motor input power to estimate motor output power and comparing said motor output power to an underload threshold to determine if an underload condition is present.

9. A system for operating a motor comprising:
   a source of AC voltage;
   a variable frequency drive (VFD) for operating said motor from said AC voltage source in a drive mode, said VFD adapted to allow entry in said VFD a setup for said VFD;
   a bypass controller for operating said motor from said AC voltage source in a mode that bypasses the operation of said motor by said VFD; and
   a serial communication channel connecting said VFD to said bypass controller to allow bidirectional communication between said VFD and said bypass controller to thereby have a duplicate of said VFD setup in said bypass controller.

10. The system of claim 9 wherein said AC voltage source has three phases and said bypass controller uses a predetermined criteria to determine when one or more of said three phases are lost, said system prohibiting operation of said motor in said bypass mode when one or more of said three phases of said AC voltage source are lost.

11. The system of claim 10 wherein said VFD has a settable current limit and said bypass controller uses said serial communication channel to cause said VFD to reduce said current limit when said bypass controller determines that one or more of said three phases of said AC voltage source are lost.

12. The system of claim 9 wherein said AC voltage source has three phases and said bypass controller determines when said system is commissioned if said AC motor will rotate in said bypass operating mode in the same direction as or in a direction opposite to said motor rotation direction in said drive mode and indicates a fault condition when said bypass controller determines that said motor will rotate in said opposite directions in said bypass operating mode.

13. The system of claim 9 wherein said bypass controller includes means for communicating with a user of said system.

14. The system of claim 9 wherein said bypass controller includes means for estimating the output power of said motor.

15. The system of claim 14 wherein said bypass controller further includes means for determining from said estimated motor output power and a predetermined underload threshold the existence of a motor underload condition.

16. A system for operating a motor comprising:
   a source of three phase AC voltage;
   a variable frequency drive (VFD) for operating said motor from said AC voltage source in a drive mode, said VFD having a settable current limit;
   a bypass controller for operating said motor from said AC voltage source in a mode that bypasses the operation of said motor by said VFD; and
   a serial communication channel connecting said VFD to said bypass controller to allow bidirectional communication between said VFD and said bypass controller;
   said bypass controller using a predetermined criteria to determine when one or more of said three phases are lost, said system prohibiting operation of said motor in said bypass mode when one or more of said three phases of said AC voltage source are lost.

17. The system of claim 16 wherein said VFD has a settable current limit and said bypass controller uses said serial communication channel to cause said VFD to reduce said current limit when said bypass controller determines that one or more of said three phases of said AC voltage source are lost.

18. The system of claim 16 wherein said bypass controller includes means for communicating with a user of said system.

19. The system of claim 16 wherein said bypass controller includes means for estimating the output power of said motor.

20. The system of claim 19 wherein said bypass controller further includes means for determining from said estimated motor output power and a predetermined underload threshold the existence of a motor underload condition.

* * * * *